United States Patent [19]

Abe et al.

[11] Patent Number: 4,597,894

[45] Date of Patent: Jul. 1, 1986

[54] COMPOSITION CONTAINING ORGANOPOLYSILOXANE HAVING POLYOXYALKYLENE AND PERFLUOROALKYL UNITS

[75] Inventors: Akira Abe; Nobuyuki Terae, both of Gunma, Japan

[73] Assignee: Shin-Etsu Chemical Co., Ltd., Tokyo, Japan

[21] Appl. No.: 597,456

[22] Filed: Apr. 5, 1984

[30] Foreign Application Priority Data

Apr. 11, 1983 [JP] Japan .................................. 58-63394

[51] Int. Cl.$^4$ .......................... B01D 17/00; C07F 7/04
[52] U.S. Cl. .................................. 252/358; 252/321; 106/287.16; 556/485
[58] Field of Search ............................. 252/358, 321; 106/287.16; 556/485

[56] References Cited

U.S. PATENT DOCUMENTS

| | | | |
|---|---|---|---|
| 2,892,859 | 6/1959 | McBee et al. | 556/485 |
| 3,536,744 | 10/1970 | Dear | 556/485 |
| 3,847,961 | 11/1974 | Koshar | 252/351 X |
| 3,984,347 | 10/1976 | Keil | 252/358 X |
| 4,028,218 | 6/1977 | Fink et al. | 252/358 X |
| 4,039,469 | 8/1977 | Raleigh | 252/358 |
| 4,128,438 | 12/1978 | Wolff et al. | 106/287.16 X |
| 4,384,100 | 5/1983 | Takamizawa | 556/485 X |
| 4,460,493 | 7/1984 | Lomas | 252/321 |

FOREIGN PATENT DOCUMENTS

| | | |
|---|---|---|
| 621428 | 6/1961 | Canada .................................. 556/485 |
| 960400 | 12/1974 | Canada . |

*Primary Examiner*—John F. Terapane
*Attorney, Agent, or Firm*—Toren, McGeady, Stanger, Goldberg & Kiel

[57] ABSTRACT

The self-emulsifiable silicone composition of the invention comprises (a) an organopolysiloxane having polyoxyalkylene moieties and perfluoroalkyl-containing organic groups and represented by the average unit formula

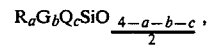

in which R is hydrogen atom or a monovalent hydrocarbon group having from 1 to 6 carbon atoms, G is polyoxyalkylene residue represented by the general formula

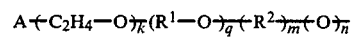

and (b) an organopolysiloxane having perfluoroalkyl-containing organic groups represented by the average unit formula

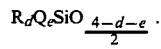

The composition is useful as an antifoam agent and, despite the high self-emulsifiability and stability, exhibits excellent defoaming activity even at relatively low temperatures around room temperature in contrast to conventional silicone-based antifoam compositions.

7 Claims, No Drawings

COMPOSITION CONTAINING ORGANOPOLYSILOXANE HAVING POLYOXYALKYLENE AND PERFLUOROALKYL UNITS

BACKGROUND OF THE INVENTION

The present invention relates to a self-emulsifiable silicone composition or, more particularly, to an organopolysiloxane composition capable of being emulsified without use of any emulsifying agent to give a stable aqueous emulsion which is useful as an antifoam agent.

As is known, some of the antifoam agents based on a silicone or an organopolysiloxane are prepared of a block copolymer of an organopolysiloxane moiety and a polyoxyalkylene moiety as the main ingredient by utilizing the water-solubility and physical and chemical stability thereof. Such a block copolymer is useful also, in addition to the use as a base ingredient of silicon antifoam agents, as a mold release agent, fiber treatment agent, additive in cosmetics and toiletry preparations, foam-conditioning agent in the preparation of polyurethane foams and the like.

When the organopolysiloxane-polyoxyalkylene block copolymers are used as a principal ingredient of an antifoam agent of the aqueous emulsion type, however, the defoaming activity thereof can be exhibited only at a temperature higher than the clouding point thereof and the defoaming power is not quite satisfactory at a relatively low temperature around room temperature in comparison with other conventional linear diorganopolysiloxanes. Further, such a block copolymer is rather inferior to conventional diorganopolysiloxanes in respects of the mold releasability, water repellency and glossing effect in respective applications above mentioned.

Improved antifoam compositions suitable for defoaming in an aqueous dyeing solution for high-temperature dyeing of fabrics and aqueous cutting oils are prepared on the base of an organopolysiloxane-polyoxyalkylene block copolymer which is combined with a diorganopolysiloxane with or without further admixture of a silica filler and/or an organopolysiloxane resin as the principal ingredient of the antifoam composition. A problem in such an antifoam agent prepared of a diorganopolysiloxane and a block copolymer of the above mentioned type in combination is the contradictory requirements for the stability of the aqueous emulsion and the effectiveness of the defoaming activity. That is, the defoaming activity can be enhanced by increasing the relative amount of the diorganopolysiloxane to the block copolymer while such an emulsion composition of high diorganopolysiloxane content is disadvantageous in the poor emulsifiability as well as in the mechanical stability and storability of the prepared emulsion. When the proportion of the block copolymer is increased, on the other hand, the emulsifiability and the stability of the emulsion can be improved though with sacrifice of the defoaming activity, especially, at low temperatures, e.g. room temperature.

SUMMARY OF THE INVENTION

It is therefore an object of the present invention to provide a novel self-emulsifiable silicone composition suitable as an antifoam agent which is readily emulsified to give a very stable aqueous emulsion useful to defoam in various media with high efficiency even at relatively low temperatures.

The self-emulsifiable silicone composition of the invention comprises:

(a) 100 parts by weight of an organopolysiloxane having polyoxyalkylene moieties and perfluoroalkyl groups and represented by the average unit formula $$R_a G_b Q_c SiO_{\frac{4-a-b-c}{2}}, \quad (I)$$

in which R is a hydrogen atom or a monovalent hydrocarbon group having 1 to 6 carbon atoms, G is an oxyalkylene residue represented by the general formula $$A(-C_2H_4-O)_k(-R^1-O)_q(-R^2)_m(-O)_n, \quad (II)$$

A being a terminal group, $R^1$ being a divalent hydrocarbon group having 3 or 4 carbon atoms, $R^2$ being a divalent hydrocarbon group having 2 to 4 carbon atoms, k and q each being a positive integer and m and n each being 0 or 1, Q is a monovalent organic group containing a perfluoroalkyl group, said perfluoroalkyl group having 1 to 18 carbon atoms, and a, b and c are each a positive number with the proviso that a+b+c is in the range from 1.9 to 2.2 inclusive, (b) from 0.1 to 200 parts by weight of perfluoroalkyl-containing organopolysiloxane repersented by the average unit formula $$R_d Q_e SiO_{\frac{4-d-e}{2}}, \quad (III)$$

in which R and Q each have the same meaning as defined above and d and e are each a positive number with the proviso that d+e is in the range from 1.9 to 2.2 inclusive, and, optionally, (c) a silica filler in an amount up to 20% by weight based on the total amount of the components (a) and (b).

DETAILED DESCRIPTION OF THE PREFERRED EMBODIMENTS

The component (a) in the inventive composition is an organopolysiloxane represented by the average unit formula (I) given above. In the formula, the symbol R denotes a hydrogen atom or a monovalent hydrocarbon group having 1 to 6 carbon atoms exemplified by methyl, ethyl, propyl, butyl, pentyl, hexyl, vinyl and phenyl groups. The group denoted by G in the formula is a polyoxyalkylene residue represented by the general formula (II) above. In this formula, the symbol $R^1$ denotes a divalent hydrocarbon group exemplified by propylene, isopropylene, butylene and isobutylene groups. The symbol $R^2$ denotes also a divalent hydrocarbon group but the hydrocarbon group may have 2 to 10 carbon atoms. Preferable examples of the group $R^2$ are ethylene, propylene, butylene and isobutylene groups. The terminal group denoted by A may be a hydrogen atom or a group selected from the class consisting of alkyl, acyl and isocyanato groups. Preferable examples of these groups include methyl, ethyl and propyl groups as the examples of alkyl groups, acetyl and propionyl groups as the examples of the acyl groups and methyl isocyanato group as the example of the isocyanato groups. The suffixes k, q, m and n each have the meaning as given above.

The symbol Q in the formula (I) denotes an organic group having 1 to 20 carbon atoms and containing a perfluoroalkyl group. The group Q can be given by another form of formula $R_fR^3$— or $R_fR^3$—S—$R^4$—, in which $R_f$ is a perfluoroalkyl group of linear or branched-chain structure having 1 to 18 carbon atoms, $R^3$ is a divalent hydrocarbon group having 1 to 12 carbon atoms exemplified by methylene, ethylene, propylene and phenylene groups and $R^4$ can be an ethylene or propylene group.

The suffixes a, b and c are each a positive number with the proviso that a+b+c is in the range from 1.9 to 2.2 inclusive.

In order that the inventive silicone composition may have excellent defoaming activity and self-emulsifiability, it is preferable that the proportion of the average molecular weight $M^2$ of the oxyalkylene moieties G in the overall average molecular weight $M^1$ of the organopolysiloxane of the formula (I), i.e. $M^2/M^1$, is in the range from 0.05 to 0.9 or, more preferably, from 0.3 to 0.8. Further, it is preferable that the values of $M^2$, k and p satisfy the relationship that the value of $M^2$ multiplied by $k/(k \rightleftarrows q)$ is in the range from 300 to 6000 or, more preferably, from 500 to 3000.

In connection with the number of the organic groups having a perfluoroalkyl group denoted by Q in the formula (I), it is preferable that the ratio of the number of the groups Q to the total number of the siloxane units in the organopolysiloxane is in the range from 0.01 to 0.9 though not particularly limitative.

Particular examples of the preferable organopolysiloxane of the formula (I) are those expressed by the following formulas denoting a methyl and a butyl group by Me and Bu, respectively:

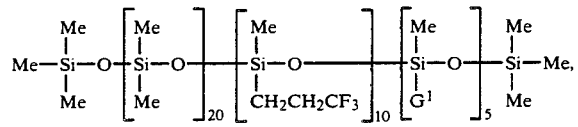

in which $G^1$ is a group of the formula

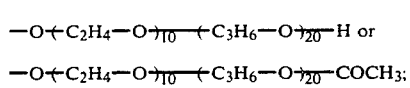

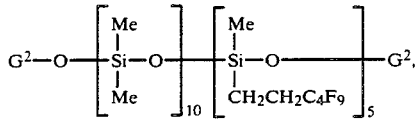

in which $G^2$ is a group of the formula

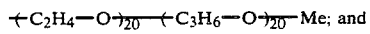

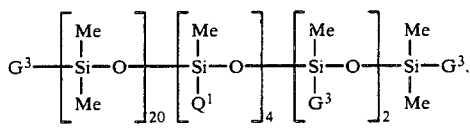

in which $G^3$ is a group of the formula

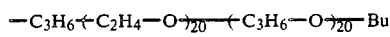

and $Q^1$ is a group of the formula —$CH_2CH_2$—S—$CH_2CH_2$—$C_4F_9$ or —$CH_2CH_2$—S—$CH_2CH_2$—$C_8F_{17}$.

In the next place, the component (b) in the inventive silicone composition is an organopolysiloxane represented by the average unit formula (III) having one or more of perfluoroalkyl groups in the molecule. The groups denoted by R and Q each may be the same one as in the component (a). In order that the inventive silicone composition can exhibit excellent defoaming activity, it is preferable that the ratio of the number $M^4$ of the perfluoroalkyl groups or perfluoroalkyl-containing organic groups Q to the total number $M^3$ of the groups denoted by R and Q, i.e. $M^4/M^3$ or $e/(d+e)$, is in the range from 0.02 to 0.95 or, more preferably, from 0.05 to 0.80.

From the standpoint of obtaining good workability, the viscosity of the component (b) should be in the range from 50 to 10000 centistokes or, preferably, from 100 to 3000 centistokes at 25° C. The molecular configuration of the organopolysiloxane as the component (b) is not particularly limitative including linear-chain, branched-chain and cyclic ones provided that the above described requirements are satisfied. Mono- and triorganosiloxane units may be contained therein in limited amounts.

Particular examples of the preferable organopolysiloxanes of the formula (III) are those expressed by the following formulas:

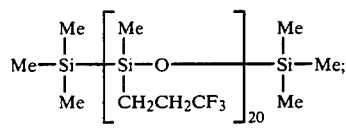

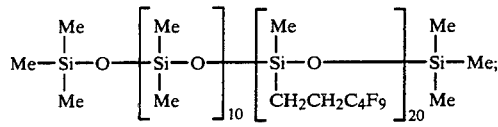

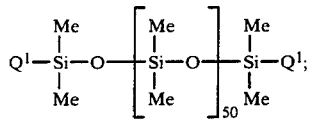

in which $Q^1$ has the same meaning as defined in connection with the examples of the component (a);

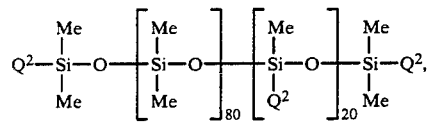

in which $Q^2$ is a group of the formula —$CH_2CH_2C_8F_{17}$; and

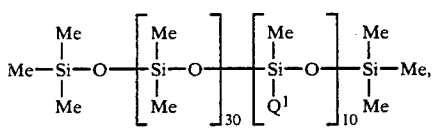

in which $Q^1$ has the same meaning as above.

The amount of this component (b) in the inventive silicone composition should be in the range from 0.1 to 200 parts by weight per 100 parts by weight of the component (a).

The component (c), which is a silica filler, is not essential but preferably to be contained in the intensive silicone composition. Any one of the wet-process and dry-process silica fillers can be used including those used conventionally in silicone rubber compositions. Several examples of the commercially available silica fillers suitable for use in this case are Aerosils by Nippon DEGUSSA Co., Nipsils by Nippon Silica Co., Carplexes by Shionogi & Co., Cab-O-Sils by Cabot Corp., Santocels by Monsanto Chemical Co. and the like. The silica filler should preferably have a specific surface area of at least 50 m$^2$/g as determined by the BET method. The amount of the silica filler as the component (c), when used, should not exceed 20% by weight based on the total amount of the components (a) and (b).

The silicone composition of the present invention is prepared by uniformly blending the above described components (a), (b) and, optionally, (c) in a suitable blending machine such as a colloid mill. Although the silicone composition of the invention is self-emulsifiable, it is optional that a small amount of a conventional emulsifying agent, such as polyoxyalkylene compounds, fatty acid esters of sorbitan, ethers of a higher alcohol, sodium laurylsulfonate and the like, is further added to the inventive composition.

Following are the examples to illustrate the formulation and effectiveness of the inventive silicone composition as an antifoam agent.

EXAMPLE 1

A silicone composition suitable as an antifoam agent was prepared by uniformly blending for 15 minutes 100 parts by weight of an organopolysiloxane-polyoxyalkylene block copolymer of the formula

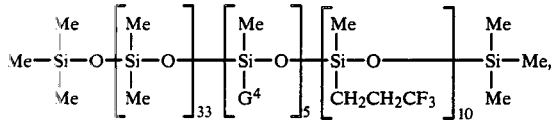

in which the symbol G$^4$ denotes a group expressed by the formula

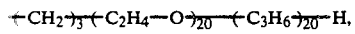

30 parts by weight of an organopolysiloxane expressed by the formula

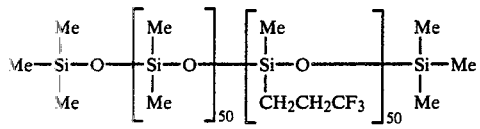

and 3 parts by weight of a finely divided silica filler Nipsil VN$_3$.

The thus prepared silicone composition was subjected to the tests of the foam-suppressing and foam-destroying activities according to the procedures given below. The results are shown in Table 1 below.

Determination of foam-suppressing activity: 100 g of a 0.2% by weight aqueous solution of sodium oleate and 0.1 g of the silicone composition under testing were taken in a 1000 ml graduated cylinder and air was bubbled continuously in the solution at room temperature through a diffuser stone at a rate of 1 liter/minute and the height reached by the rising foams in the cylinder was recorded after 5, 10 and 20 minutes of air bubbling in ml of the foam volume.

Determination of foam-destroying activity: 100 g of a 0.2% by weight aqueous solution of sodium oleate were taken in a 1000-ml graduated cylinder and air was bubbled in the solution in advance through a diffuser stone to have the foams occupying a volume of 1000 ml followed by dropwise addition of 0.2 ml of a 10% by weight aqueous solution of the silicone composition under test and the volume of the foams was recorded 2 minutes thereafter.

For comparison, three comparative tests were undertaken in addition to the above mentioned test according to the invention in the same manner as above using the organosiloxane-polyoxyalkylene block copolymer used in the above preparation alone (Comparative Test 1), a pasty composition prepared by uniformly blending 100 parts by weight of a polyoxyalkylene-containing organopolysiloxane of the formula

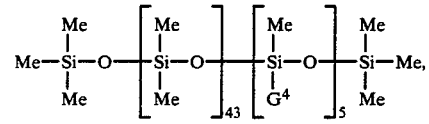

in which G$^4$ has the same meaning as defined above, 30 parts by weight of a dimethylpolysiloxane having a viscosity of 1000 centistokes at 25° C. and 3 parts by weight of the silica filler Nipsil VN$_3$ (Comparative Test 2) or the same polyoxyalkylene-containing organopolysiloxane used in the formulation in the above Comparative Test 2 alone (Comparative Test 3). The results of these comparative tests are also shown in Table 1.

TABLE 1

| | Volume of foams, ml, in foaming suppression test after bubbling for | | | Volume of foams, ml, in foam destruction test |
|---|---|---|---|---|
| | 5 minutes | 10 minutes | 20 minutes | |
| Inventive test | 140 | 165 | 200 | 145 |
| Comparative test 1 | 560 | 880 | >1000 | 290 |
| Comparative test 2 | 240 | 490 | 850 | 240 |
| Comparative test 3 | >1000 | — | — | 450 |

EXAMPLE 2

A silicone composition suitable as an antifoam agent was prepared by uniformly blending, in the same manner as in Example 1, 100 parts by weight of an organopolysiloxane-polyoxyalkylene block copolymer expressed by the formula

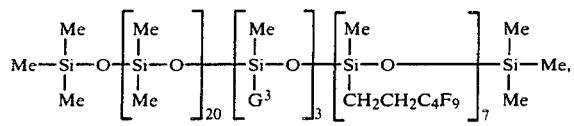

in which G³ is a polyoxyalkylene residue defined before, 20 parts by weight of a perfluorobutyl-containing diorganopolysiloxane expressed by the formula

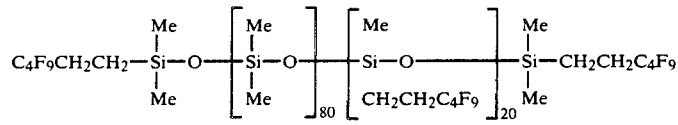

and 2 parts by weight of a finely divided silica filler Aerosil 380 sold by DEGUSSA Co. The thus prepared silicone composition according to the invention was subjected to the test of foam-suppression in the following manner to give the results. shown in Table 2.

Determination of foam-suppressing activity: 100 g of a 0.3% by weight aqueous solution of a polyoxyethylene nonyl phenyl ether (Emulgen 909 manufactured by Kao-Atlas Co.) and the silicone composition under test in an amount of 20 ppm by weight were taken in a 1000 ml graduated cylinder and air was continuously bubbled in the solution kept at 80° C. through a diffuser stone at a rate of 1 liter/minute to record the volume of the rising foams after 5, 10 or 20 minutes of the air bubbling. Further, the same test for foam-suppression was repeated at room temperature by increasing the amount of the silicone composition to 100 ppm.

For comparison, the same tests as above were repeated by replacing the inventive silicone composition above with the polyorganosiloxane-polyoxyalkylene block copolymer alone (Comparative Test 4) or a silicone composition prepared, in the same manner as above, of 100 parts by weight of a polyoxyalkylene-containing organopolysiloxane of the formula

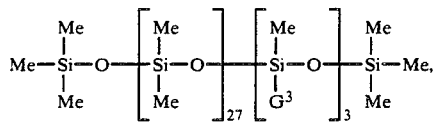

in which G³ has the meaning as defined before, 20 parts by weight of a dimethylpolysiloxane having a viscosity of 2000 centistokes at 25° C. and 2 parts by weight of Aerosil A380 (Comparative Test 5). The results are also shown in Table 2.

TABLE 2

| | Amount of antifoam agent, ppm | Temperature, °C. | Volume of foams, ml, after air bubbling for | | |
|---|---|---|---|---|---|
| | | | 5 minutes | 10 minutes | 20 minutes |
| Inventive test | 20 | 80 | 145 | 150 | 150 |
| | 100 | Room temperature | 170 | 200 | 250 |
| Comparative test 4 | 20 | 80 | 160 | 165 | 170 |
| | 100 | Room temperature | 540 | 920 | 1000 |
| Comparative test 5 | 20 | 80 | 150 | 160 | 180 |
| | 100 | Room temperature | 410 | 880 | 1000 |

EXAMPLE 3

A silicone composition was prepared by uniformly blending 100 parts by weight of an organopolysiloxane-polyoxyalkylene block copolymer expressed by the formula

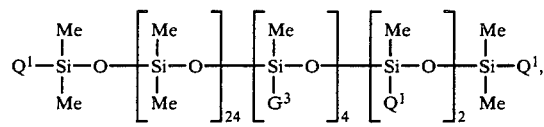

in which G³ has the meaning defined before and Q¹ is a perfluoroalkyl-containing organic group of the formula —CH₂CH₂—S—CH₂CH₂—C₄F₉, and 25 parts by weight of a perfluoroalkyl-containing organopolysiloxane of the formula

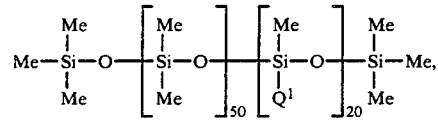

in which Q¹ has the same meaning as defined above. The thus prepared silicone composition was subjected to the test of foam-suppression of aqueous cutting oil in the following manner to give the results shown in Table 3 below.

Determination of foam-suppressing activity: an aqueous cutting oil (Shimilon A, a product by Daido Chemical Co.) was admixed with 0.5% by weight of the above prepared silicone composition and the mixture was kept at 40° C. in a thermostat for 7 days to examine the storage stability. The cutting oil admixed with the silicone composition was diluted 50 times with water and 200 g of the thus diluted cutting oil solution were taken in a 1000 ml graduated cylinder into which air was continuously bubbled at a rate of 1 liter/minute through a diffuser stone to record the volume of the rising foams after 5, 10 or 20 minutes of air bubbling.

For comparison, comparative tests were undertaken in the same manner as above except that the above used silicone composition was replaced with the same amount of the same organopolysiloxane-polyoxyalkylene block copolymer as sued in the above formulation of the composition (Comparative Test 6) or with the same amount of an organopolysiloxane composition prepared of 100 parts by weight of the same organopolysiloxane-polyoxyalkylene block copolymer as used in Comparative Test 5 of Example 2 and 25 parts by weight of a dimethylpolysiloxane having a viscosity of 1000 centistokes at 25° C. (Comparative Test 7). The results of these comparative tests are also shown in Table 3.

TABLE 3

| | Volume of foams, ml, after air bubbling for | | | Stability in storage |
|---|---|---|---|---|
| | 5 minutes | 10 minutes | 20 minutes | |
| Inventive test | 230 | 235 | 240 | No phase separation |
| Comparative test 6 | 410 | 450 | 480 | No phase separation |
| Comparative test 7 | 310 | 320 | 430 | Complete phase separation |

The self-emulsifiable silicone composition described in the above in detail has good self-emulsifiability as well as mechanical stability and stability at high temperatures comparable to or even superior to conventional silicone antifoam compositions while the defoaming activity thereof is excellent. In particular, the inventive silicone composition has very remarkably improved foam-suppressing and foam destroying activities so that sufficiently high defoaming effect can be obtained even by use of one third to one sixth of the amount of conventional antifoam agents. Further, the defoaming acitivity of the inventive antifoam silicone composition is exhibited even at a relatively low temperature of around room temperature in contrast to conventional antifoam agents of which the defoaming activity is unavoidably decreased with the decrease in the temperature.

What is claimed is:

1. An antifoam silicone composition which comprises:
   (a) 100 parts by weight of an organopolysiloxane having polyoxyalkylene moieties and perfluoroalkyl groups and represented by the average unit formula

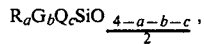

in which R is a hydrogen atom or a monovalent hydrocarbon group having from 1 to 6 carbon atoms, G is polyoxyalkylene residue represented by the general formula

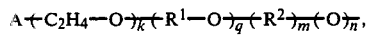

A being a terminal group selected from the group consisting of a hydrogen atom, alkyl groups, acyl groups and isocyanato groups, $R^1$ being selected from the group consisting of n-propylene; isopropylene, n-butylene and isobutylene, $R^2$ being selected from the group consisting of ethylene, n-propylene, isopropylene, n-butylene and isobutylene, k and q each being a positive integer and m and n each being 0 or 1; Q is a group represented by the formula $R_fR^3$—, or $R_fR^3$—S—$R^4$— in which $R_f$ is a perfluoroalkyl group having from 1 to 18 carbon atoms, $R^3$ is a divalent hydrocarbon group having from 1 to 12 carbon atoms and $R^4$ is an ethylene group or a propylene group, with the proviso that Q does not contain more than 20 carbon atoms, and a, b and c are each a positive number with the proviso that a+b+c is in the range from 1.9 to 2.2 inclusive, and
   (b) from 0.1 to 200 parts by weight of a perfluoroalkyl-containing organopolysiloxane represented by the average unit formula

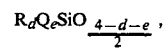

in which R and Q each have the same meaning as defined above and d and e are each a positive number with the proviso that d+e is in the range from 1.9 to 2.2 inclusive.

2. The antifoam silicone composition as claimed in claim 1 which further comprises a silica filler in an amount not to exceed 20% by weight based on the total amount of the components (a) and (b).

3. The antifoam silicone composition as claimed in claim 1 wherein the monovalent hydrocarbon group denoted by R is selected from the class consisting of methyl, ethyl, propyl, butyl, pentyl, hexyl, vinyl and phenyl groups.

4. The antifoam silicone composition as claimed in claim 1 wherein the ratio of the average molecular weight $M^2$ of the polyoxyalkylene moieties denoted by G to the average molecular weight $M^1$ of the organopolysiloxane as the component (a) is in the range from 0.05 to 0.9.

5. The antifoam silicone composition as claimed in claim 1 wherein the ratio of the number of the perfluoroalkyl-containing organic groups to the number of the siloxane units in the component (a) is in the range from 0.01 to 0.9.

6. The antifoam silicone composition as claimed in claim 1 wherein the ratio of the number of the perfluoroalkyl-containing organic groups to the number of the siloxane units in the component (b) is in the range from 0.02 to 0.95.

7. The antifoam silicone composition as claimed in claim 1 wherein the organopolysiloxane as the component (b) has a viscosity in the range from 50 to 10000 centistokes at 25° C.

* * * * *